United States Patent Office 3,655,879
Patented Apr. 11, 1972

3,655,879
RUFOMYCIN
Koiti Nakazawa, Amagasaki, Motoo Shibata, Toyonaka, Eiji Higashide and Toshihiko Kanzaki, Nishinomiya, Hiroichi Yamamoto, Kobe, Akira Miyake and Jisaburo Ueyanagi, Nishinomiya, and Hidesuke Isasaki, Toyonaka, Japan, assignors to Takeda Chemical Industries, Ltd., Osaka, Japan
Filed Feb. 7, 1961, Ser. No. 87,677
Claims priority, application Japan, Feb. 8, 1960, 35/4,033
Int. Cl. A61k 21/00
U.S. Cl. 424—122                                   8 Claims

ABSTRACT OF THE DISCLOSURE

The invention involves the new antibiotics Rufomycin A (average elemental analysis 62.325% carbon, 7.51% hydrogen and 10.985% nitrogen) and Rufomycin B (average elemental analysis 62.283% carbon, 7.827% hydrogen and 11.753% nitrogen) and methods of producing these antibiotics from *Streptomyces atratus* cultures.

---

Figure 1:
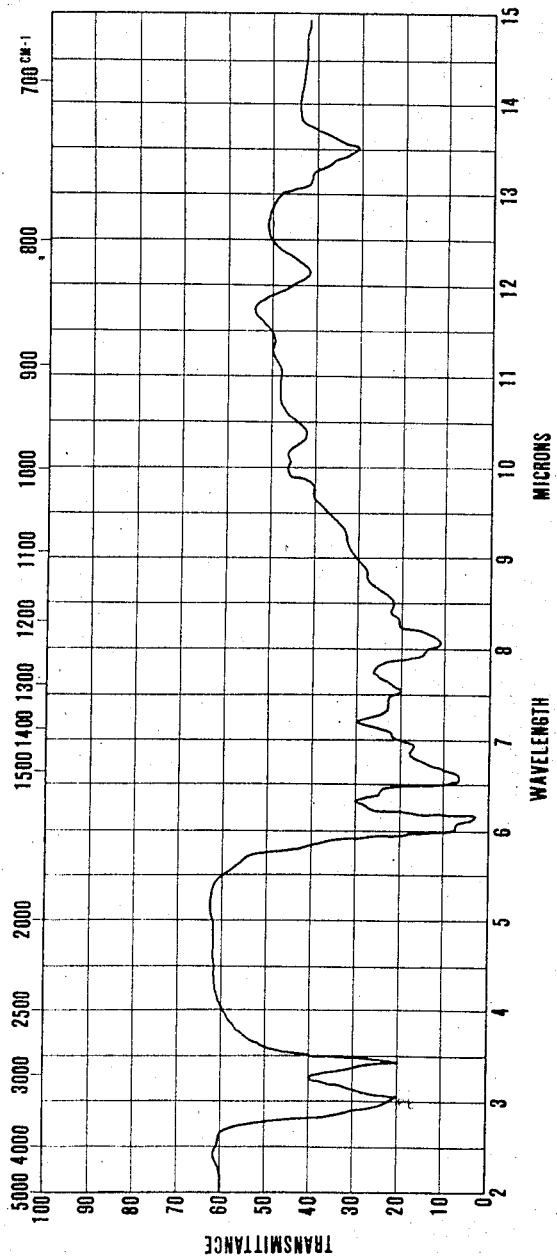

This invention relates to Rufomycin, a novel antibiotic produced from a strain of a microorganism belonging to the genus Streptomyces.

According to the present invention, a certain microorganism, designated *Streptomyces atratus* nov. sp., produces a novel antibiotic, designated Rufomycin. The microorganism can be incubated artificially to accumulate the antibiotic in the broth, from which the antibiotic can then be recovered. *Streptomyces atratus* generally produces concomitantly two antibiotics, which are specifically different from each other in properties. Both are, however, encompassed within the designation Rufomycin. For differentiatory purposes, it is convenient to designate them respectively as Rufomycin A and Rufomycin B.

A strain of *Streptomyces atratus* was first isolated from a specimen of soil collected at the river-side of the Kinokawa, Wakayama Prefecture, Japan, and a culture has been deposited at Institute for Fermentation, Osaka, Japan and also at American Type Culture Collection, Washington, D.C., U.S.A. under the respective accession numbers of IFO-3897 and ATCC-14046. The culture characteristics of the strain are as follows. (In the culture characteristics, color names marked "Rdg." are based on Ridgway's Color Standards and Color Nomenclature).

(1) This strain—*Streptomyces atratus* nov. sp. (ATCC-14046; IFO-3897)—is regarded as a microorganism belonging to the *Streptomyces hygroscopicus*-group, as its aerial mycelia become moistened and blackened when incubated on glucose-asparagine agar for two weeks or more.

(2) Vegetative mycelium: Spreading, penetrate into the medium colorless to Chamois (Rdg. XXX, 19″-b); Hyphae 0.5 to 0.6 micron in diameter. No soluble pigment on most media.

(3) Aerial mycelium: Powdery, white, later Deep Mouse Gray (Rdg. LI, 15′′′′′-i) to Slate color (Rdg. LIII, Carbon gray-k) and on certain media (e.g. glucose-asparagine agar) becomes moistened and exhibits dark glistening patches. Sporophore produces open loop or spiral. Hyphae short, tangled, branched, 1.5 to 1.8 microns in diameter. Spores ellipsoidal to cylindrical, 1.3 to 1.4 microns by 1.6 to 2.3 microns.

(4) Culture characteristics of various media: (see following Table 1).

TABLE 1

| Medium | Vegetative mycelium | Aerial mycelium | Reverse | Soluble pigment | Remarks |
|---|---|---|---|---|---|
| Czapek's agar | Thin, spreading, colorless, penetrate into the medium. | Scant, White later Mouse Gray (Rdg. LI, 15′′′′′). | No pigment | None | |
| Glucose Czapek's agar. | Abundant, spreading, colorless later Deep Colonial Buff (Rdg. XXX, 21″-b). | Scant, White to Deep Mouse Gray (Rdg. LI, 15′′′′′-i). | Colorless later | do | |
| Glucose asparagine agar. | Thin, spreading, colorless, penetrate into the medium. | Powdery, White later Deep Mouse Gray (Rdg. LI, 15′′′′′-i) to Slate Color (Rdg. LIII, Carbon gray-k), on this medium after more than two weeks culture becomes moistened and exhibits dark, glistening patches. | Colorless later black. | do | |
| Yeast extract agar | Abundant, spreading, wrinkled, colorless. | Very scant, White | No pigment | do | |
| Nutrient agar | Spreading, smooth, colorless | None | do | do | |
| Glucose nutrient agar. | Abundant, spreading, wrinkled, colorless. | Abundant, White later Dark Mouse Gray (Rdg. LI, 15′′′′′-k) to Blackish Mouse Gray (Rdg. LI, 15′′′′′-m). | Colorless to Blackish Mouse Gray (Rdg. LI 15′′′′′-m). | do | |
| Glycerine nutrient agar. | Abundant, spreading, folded, Colorless to Yellowish Gloucous (Rdg. XLI, 25′′′-f). | Scant, White to Mouse Gray (Rdg. LI, 15′′′′′. | Colorless to greenish brown. | Colorless to Yellowish Glaucous (Rdg. XLI, 25′′′-f). | |
| Bouillon | | | | | Transparent medium, no mycelium on the surface edge. Growth sinks to the bottom. |
| Glucose bouillon | | | | | Transparent medium, no mycelium on the surface edge. Growth sinks to the bottom. |
| Cellulose | | | | | No growth. |
| Egg medium | Spreading, wrinkled Deep Colonial Buff (Rdg. XXX, 21″-b). | Scant, White | | | Medium no change. |
| Milk | | | | | Strong peptonization without coagulation within 10 days at 7° C. |
| Carrot plug | Colorless, spreading | White later Deep Mouse Gray (Rdg. LI, 15′′′′′-i). | | | Medium no change. |
| Potato plug | Abundant, folded, Honey Yellow (Rdg. XXX, 19″). | None | | | Do. |
| Gelatin | | | | | Complete liquefaction in one week without soluble. |

TABLE 1.—Continued

| Medium | Vegetative mycelium | Aerial mycelium | Reverse | Soluble pigment | Remarks |
|---|---|---|---|---|---|
| Tyrosinate agar | Thin, spreading, colorless | None | No pigment | None | |
| Calcium malate agar. | Abundant, spreading, colorless to Colonial Buff (Rdg. LI, 15''''). | Scant, White later Mouse Gray (Rdg. LI, 15''''). | No pigment | None | |
| Nitrate | | | | | Reduction, transparent with abundant mycelium at the bottom. |
| Starch agar | Colorless, spreading | Very scant, White | No pigment | None | |
| Starch agar plate | | | | | Hydrolyzed; Hydrolyzed zone per growth diameter is from 4 to 6. Hydrolyzed zone/Growth diameter-33 millimeter/5.5 millimeter. |

(5) Carbon utilization on an agar slant in Pridham and Gotleab's method:

| | |
|---|---|
| Glycerin | +++ |
| Xylose | − |
| Fructose | + |
| Ribose | ++ |
| Glucose | +++ |
| Sorbose | − |
| Mannose | +++ |
| Maltose | +++ |
| Galactose | +++ |
| Lactose | ++ |
| Mannitol | − |
| Sorbitol | ± |
| Sucrose | − |
| Raffinose | +++ |
| Rhamnose | ++ |
| Cellobiose | +++ |
| Erythritol | − |
| Dextrin | +++ |
| Starch | + |
| Sodium acetate | ++ |
| Sodium citrate | ++ |
| Sodium succinate | ++ |

Remarks:
+++ Very good growth,
++ Good growth,
+ Fair growth,
± Sparingly growth,
− No growth.

(6) Antimicrobial spectrum of living culture: On a bouillon agar or a glycerin bouillon agar in a dish, *Streptomyces atratus* is streaked and is incubated for 4 days at 28° C. Then the following culture is streaked at right angles thereto. Inhibition length against all the following microorganisms was zero.

Microorganisms tested on both media: *Escherichia coli, Proteus vulgaris, Staphylococcus aureus, Bacillus subtilis, Bacillus cereus.*

Microorganisms tested on bouillon agar solely: *Serratia marcescens, Bacillus brevis.*

Microorganisms tested on glycerin bouillon agar solely: *Mycobacterium* sp. 607, *Mycobacterium avium, Mycobacterium avium* streptomycin resistant.

Among known microorganisms, the most closely resembling species to *Streptomyces atratus* are *Streptomyces halstedii* and *Streptomyces hygroscopicus*, but the properties observed on even these two species are clearly different from those of *Streptomyces atratus*. Thus, considerably distinct differences between *Streptomyces atratus* and *Streptomyces halstedii* or *Streptomyces hygroscopicus* in the respective characteristics on a variety of culture media are shown in the following table:

TABLE 2

| Culture media | St. atratus | St. halstedii | St. hygroscopicus |
|---|---|---|---|
| Glucose-asparagin agar | Reverse, colorless later Black | Reverse, colorless later Black | Reverse, Cream color. |
| Glucose bouillon agar and Glycerine bouillon agar. | do | do | Reverse, colorless. |
| Egg medium | Vegetative mycelium, Deep Colonial Buff. | Vegetative mycelium, colorless | No growth. |
| Yeast extract agar | Reverse, colorless | Reverse, colorless later Black | Reverse, colorless. |
| Potato plug | Vegetative mycelium, Honey yellow. Color of medium, no change. | Vegetative mycelium, colorless to Cream color. Color of medium, Pale Brown. | Vegetative mycelium, colorless to Cream color. Color of medium, Brown. |
| Carrot plug | Vegetative mycelium, abundant colorless. Color of medium, no change. | No growth | Vegetative mycelium, abundant Olive Buff. Color of medium, Dark gray. |
| Glucose Czapek's agar | Vegetative mycelium, spreading, not rised up, colorless later Deep Colonial Buff. Reverse, colorless later Cream color. | Vegetative mycelium, restricted, rised up, lump like, Yellow. Reverse, colorless. | Vegetative mycelium, spreading, rised up, colorless later Cinnamon Buff. Reverse, colorless later Cinnamon. |
| Milk | Strong peptonization without coagulation. | Weak peptonization with coagulation | Fairly strong peptonization without coagulation. |
| Nitrate reduction | Reduces | Reduces | Does not reduce. |
| Calcium malate agar | Vegetative mycelium, spreading, colorless to Colonial Buff. Reverse, colorless. | Vegetative mycelium, restricted, colorless. Reverse, colorless. | Vegetative mycelium, spreading, colorless. Reverse, Cream color. |
| Tyrosinate agar | Vegetative mycelium, spreading, colorless. Reverse, colorless. | Vegetative mycelium, restricted, Vinaceous Buff. Reverse, colorless later Vinaceous Buff. | Vegetative mycelium, spreading, Vinaceous Buff of Yellow. Reverse, colorless later Tilleul Buff. |

NOTE.—The color names are based on "Color Standards and Color Nomenclature" by R. Ridgway.

Morphological differences are observed in that sporophores of *Streptomyces atratus* are mainly loop-shaped and rarely form spirals in one to two rounds, though *Streptomyces halstedii* has many closed spirals and *Streptomyces hygroscopicus* has mainly spirals of one to two rounds. Several differences therebetween in utilizabilities of carbon sources are shown in the following table:

TABLE 3

| | St. atratus | St. halstedii | St. hygroscopicus |
|---|---|---|---|
| D-Xylose | − | +++ | + |
| L-Rhamnose | ++ | − | − |
| L-Sorbose | − | − | + |
| D-Mannitol | − | − | +++ |
| Sorbitol | − | − | ++ |

The most important difference between *Streptomyces atratus* and the others is that, though *Streptomyces halstedii* produces Carbomycin and Carbomycin B and *Streptomyces hydroscopicus* produces Hygromycin, Hyroscopin, Angustmycin, etc., *Streptomyces atratus* does not produce any of these antibiotics but produces Rufomycin.

The above-mentioned culture characteristics and comparative data demonstrate that *Streptomyces atratus* is a novel species belonging to actinomycetes. In the method of the present invention, however, without being limited to the particular strain of *Streptomyces atratus* mentioned above, any of the strains capable of producing Rufomycin can be employed. Of course, any of the mutants or variants of *Streptomyces atratus* which are isolated from soil or those strains which are derived from *Streptomyces atratus* or mutants or variants thereof produced by artificial mutation and/or variation, may be used so long as the strain retains its ability to produce Rufomycin. Artificial mutation or variation can be effected by such means as radiation with rays, addition of chemicals into culture medium, isolation of monospore, etc. Even if characteristics of a strain do not bear resemblance to those of *Streptomyces atratus* as afore-mentioned, the strain may be used in the method of the present invention when the strain has the ability to produce Rufomycin.

In the method of the present invention, such a strain as mentioned above is cultivated in a culture medium. The culture medium may be solid or liquid; however, the latter form is desirable for effecting the process in a large scale. It is usually desirable that the culture medium contain such nutrients as assimilable carbon sources, digestible nitrogen sources, inorganic substances, vitamins, trace elements, growth promoting factors, etc. These nutrients may be those obtained from natural sources or may be synthetic. As the carbon sources there may be used, for example, glucose, lactose, glycerin, starch, dextrin, maltose, etc.; as the nitrogen sources, for example, peptone, soy-bean flour, rice bran, cornsteep liquor, gluten, casein, etc.; and as the inorganic nutrients, for example, sodium chloride, carbonates, mineral salts, phosphates, etc. It is desirable that cultivation of the strain be carried out under aerobic conditions, so that it is advantageously effected under agitation and/or aeration. In general, the preferred temperautre, pH of the medium, and culture period are 26–30° C., about neutral and 3–5 days respectively. Of course, such conditions as mentioned above may be variable so long as they do not hamper the object of this invention.

Rufomycin is formed and accumulated in the incubation broth. Part of the Rufomycin thus formed remains in the mycelia of the incubated microorganism, while the rest comes out through the cell wall into the medium and is accumulated. Hence, Rufomycin thus produced may be directly collected from the whole incubation broth. However, it is often more advantageous that the liquid part of the broth be separated from the solid part by e.g. filtration, centrifugation, etc., and extraction of Rufomycin carried out on each of them. Recovery of Rufomycin from the broth can be effected by utilizing differences between Rufomycin and impurities in such physicochemical properties as solubilities in a solvent, adsorbabilities on an adsorbent, crystallizabilities, etc. For example, Rufomycin may be extracted from the fermentation broth or its liquid or solid part with a solvent such as ethanol, ethyl acetate, acetone, or the like. Rufomycin may be conveniently purified, for example, by adsorption chromatography, in which a proper adsorbent such as alumina, silica-gel, etc. is used; by recrystallization from a proper solvent such as ethanol, methanol, an aqueous alcohol, etc.; by counter current distribtuion; by fractional precipitation; or by the other means utilized generally to recover a product from an incubation broth, while taking advantage of the differential physicochemical properties of Rufomycin and the impurities.

As the result of the treatments mentioned above, there are obtained from the culture broth of the Rufomycin-producing strain the two varieties of antibiotic, which are named Rufomycin A and Rufomycin B, respectively and have rather similar properties. However, the difference in their solubilities, for example, in ethanol, makes it possible to separate them from each other. More concretely stated, when an aqueous ethanol solution of both antibiotics, is concentrated under reduced pressure and allowed to stand for a while, Rufomycin B separates out as crystals and Rufomycin A is obtained by evaporating the solvent of the mother liquor to dryness under reduced pressure.

Rufomycin A shows the following properties:

(1) It is a physiologically neutral substance and is obtained usually as powder.

(2) It is insoluble in water and not easily soluble in ethyl ether, petroleum ether, benzene, carbon tetrachloride, etc., but easily soluble in methanol, ethanol, propanol, ethyl acetate, chloroform, pyridine, dioxane, glacial acetic acid, acetone, dimethylformamide, 2-methoxyethanol (methyl Cellosolve), etc.

(3) It is a negative to ninhydrin reaction, Molish's reaction, Fehling's reaction, Sakaguchi's reaction, ferric chloride reaction, maltol reaction, sodium nitroprusside reaction, etc., but positive to diazo reaction.

(4) Its infrared absorption spectrum measured in potassium bromide disk is shown in FIG. 1, and the significant absorption bands are as follows: 3.0(s.), 3.27(w.), 3.4(s.), 6.04(sh.), 6.1(vs.), 6.53(s.), 6.64(m.), 6.90(w.), 7.1(sh.), 7.32(w.), 7.55(m.), 8.02(s.), 8.54(w.), 8.85(w.), 9.37(w.), 9.80(w.), 10.05 (w.), 10.337(w.), 10.96(w.), 11.433(w.), 12.20(m.), 13.15(sh.) and 13.55(m.) microns.

Remarks: vs., very strong; s., strong; sh., shoulder; m., moderate; w., weak.

Figure 3:
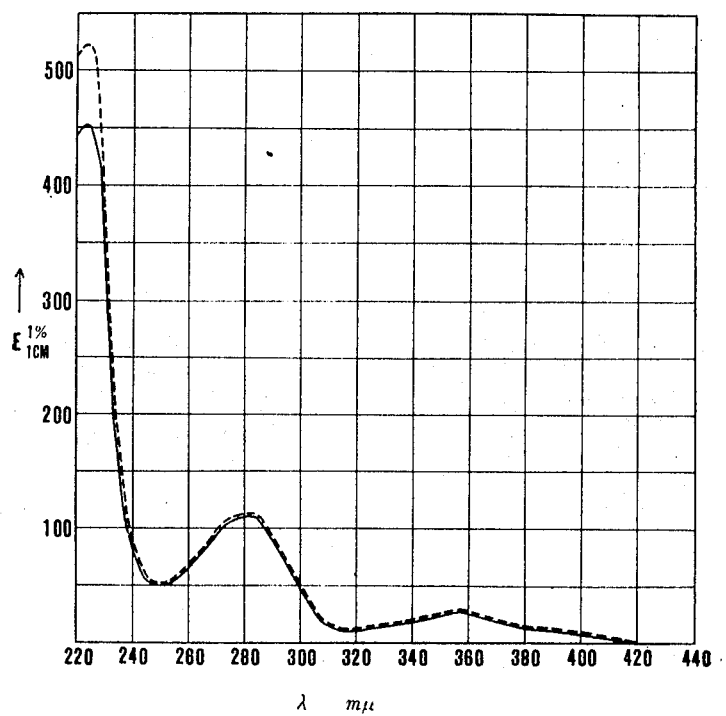

(5) Its ultraviolet absorption spectrum in ethanol is shown in FIG. 3 as the solid line and the maximum values are as follows:

$$\lambda_{max.}\ 222\ m\mu\ (E_{1cm.}^{1\%}=450)$$

$$\lambda_{max.}\ 282\ m\mu\ (E_{1cm.}^{1\%}=100)$$

$$\lambda_{max.}\ 355\ m\mu\ (E_{1cm.}^{1\%}=27)$$

(6) Specific rotation: $[\alpha]_D^{21} = -64°$ (c.=1%, in ethanol).

(7) As a result of elementary qualitative analysis, neither halogen nor sulphur was detected and elementary analyltical values were:

(1) C, 62.39%; H, 7.69%; N, 10.80%.

(2) C, 62.26%; H, 7.33%; N, 11.17%. (Average) C, 62.325%; H, 7.51%; N, 10.985%.

(8) Stability of Rufomycin A was examine under several conditions. The antimicrobial potency declined by boiling at pH 9 for one hour to about half. Rufomycin A is fairly stable at a neutral or an acidic pH. In the test, the antimicrobial potency was determined by agar dilution method using *Mycobacterium avium*, streptomycin resistant strain, as the test microorganism.

| Solvent | pH | Treatment | Potency (U/ml.) |
|---|---|---|---|
| None | | 100° C. for 1 hr. in vacuo | 2,000 |
| Methanol | (1) | Refluxing for 1 hr | 1,500 |
| HCl-acidic methanol | 2.0 | do | 1,500 |
| NaOH-alkaline methanol | 9.0 | do | 750 |

¹ Neutral.

Rufomycin B, on the other hand, has the following characteristics:

(1) It is a neutral substance and occurs as yellow prism-like crystals which melt at 165–168° C. with decomposition.

(2) It is insoluble in water, hardly soluble in ethyl ether, petroleum ether, benzene, carbon tetrachloride, etc., and slightly soluble in ethanol, butanol, etc., but easily soluble in methanol, hot ethanol, ethyl acetate, chloroform, pyridine, dioxane, glacial acetic acid, etc.

(3) As a result of titration, it shows pKa' 8.4 in methanol-water.

(4) It exhibits the same characteristics as Rufomycin A in color reactions.

Figure 2:
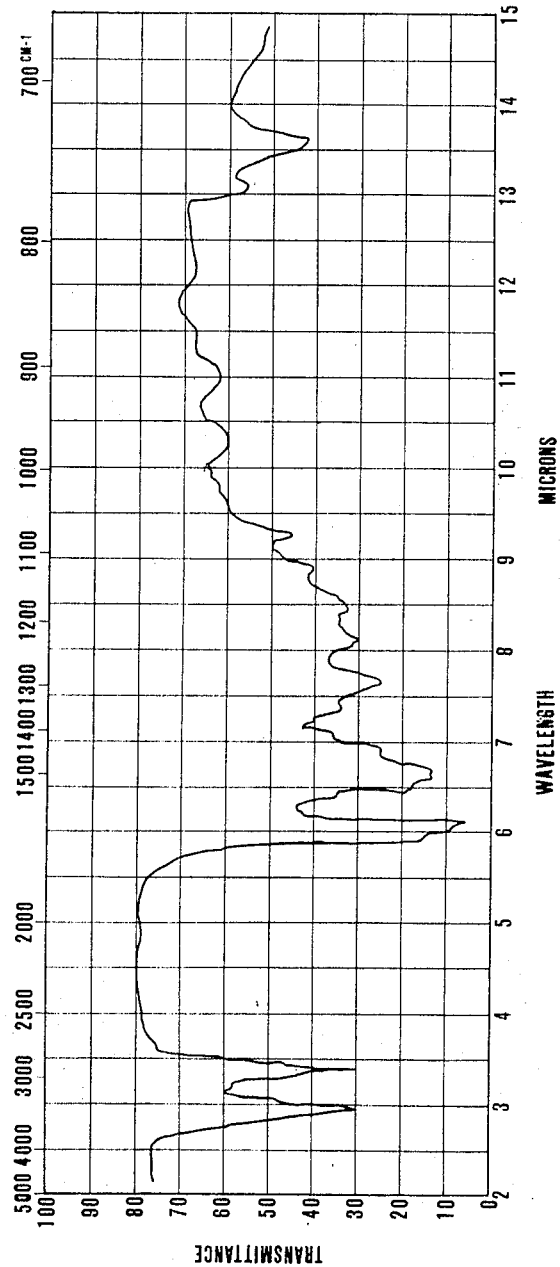

(5) Its infrared absorption spectrum in potassium bromide disk is shown in FIG. 2 and the significant absorption bands thereof are as follows: 3.04(s.), 3.26(w.), 3.38(s.), 5.94(sh.), 6.05(sh.), 6.10(vs.), 6.53(s.), 6.6(sh.), 6.9(m.), 7.1(sh.), 7.25(sh.), 734(w.), 7.62(m.), 7.85(w.), 8.05(m.), 8.32(w.), 8.50(w.), 8.85(m.), 9.26(m.), 10.35(w.), 10.90(w.), 11.45(w.), 12.15(w.), 13.10(w.) and 13.55(m.) microns.

Remarks: vs., very strong; s., strong; sh., shoulder; m., moderate; w., weak.

(6) Its ultraviolet absorption spectrum in ethanol is shown in FIG. 3 as the dotted line and the maximum values are as follows:

$$\lambda_{max.}\ 222\ m\mu\ (E_{1\ cm.}^{1\%} = 524)$$

$$\lambda_{max.}\ 282\ m\mu\ (E_{1\ cm.}^{1\%} = 113)$$

$$\lambda_{max.}\ 355\ m\mu\ (E_{1\ cm.}^{1\%} = 28)$$

(7) Specific rotation: $[\alpha]_D^{20} = -120°$ (c.=0.5%, in methanol).

(8) Elementary analytical values are shown below, and therefore it is supposed that Rufomycin B has the molecular formula $C_{31}H_{47}N_5O_7$:

(1) C, 62.28%; H, 7.89%; N, 11.88%. (2) C, 62.29%; H, 7.80%; N, 11.67%. (3) C, 62.28%; H, 7.79%; N, 11.71%. (Average) C, 62.283%; H, 7.82%; N, 11.753%. Calcd. for $C_{31}H_{47}N_5O_7$: C, 61.87%; H, 7.87%; N, 11.64%.

Both Rufomycin A and Rufomycin B show specific inhibitory activity to acid-fast bacteria, especially *Mycobacterium tuberculosis* var. *hominis*, though they are inactive to usual Gram positive bacteria and Gram negative bacteria. That is, the result of bioassay of Rufomycin A and Rufomycin B by dilution method is shown as the following antibacterial spectra. In this test, *Mycobacterium tuberculosis* was inoculated on Kirchner's medium, the other acid-fast bacteria on glycerin-bouillon agar, and other usual bacteria on bouillon agar, respectively, and the solvent was methanol.

| Test bacteria | Minimum inhibitory concentration (mcg./ml.) | |
|---|---|---|
| | Rufomycin A | Rufomycin B |
| *Escherichia coli* | >100 | >100 |
| *Proteus vulgaris* | >100 | >100 |
| *Staphylococcus aureus* | >100 | >100 |
| *Bacillus subtilis* | >100 | >100 |
| *Pseudomonas aeruginosa* | >100 | >100 |
| *Serratia marcescens* | >100 | >100 |
| *Bacillus brevis* | 100 | >100 |
| *Sarcina lutea* | 100 | >100 |
| *Mycobacterium species 607* | 2.0 | 5.0 |
| *Mycobacterium avium* | 1.0 | 5.0 |
| *Mycobacterium avium*, streptomycin resistant | 1.0 | 5.0 |
| *Mycobacterium avium*, neomycin resistant | 1.0 | 5.0 |
| *Mycobacterium smegmatis* | 0.2 | 0.5 |
| *Mycobacterium phlei* | 2.0 | 5.0 |
| *Mycobacterium tuberculosis*, $H_{37}Rv$ | 0.1 | 1.0 |

As the above-mentioned characteristics of Rufomycin A and Rufomycin B are quite different from those of any known antibiotics, it is confirmed that both Rufomycin A and Rufomycin B are novel antibiotics.

To the mice inoculated with lethal amount of *Mycobacterium tuberculosis* $H_{37}Rv$ was subcutaneously injected 0.5 mg./day/mouse of Rufomycin A and the injection was repeated until the mice were respectively killed, when significant prolongation of survival time (ST) was observed as follows, for example:

Dosage:                                 $ST_{50}$ (days)
  Control _____ 15.0
  Rufomycin A 0.5 mg. _____ 19.0
  Rufomycin A 1.0 mg. _____ 22.0
  Rufomycin A 2.0 mg. _____ 30.9

The respective toxicities of Rufomycin A and Rufomycin B were observed on 4 weeks old male mice (strain dd) by intraperitoneal injection.

Rufomycin A: $LD_0 = 4,000$ mg./kg.
Rufomycin B: $LD_0 = 2,000$ m./kg.

Minimum lethal dose of Rufomycin B by intraperitoneal injection was 4,000 mg./kg.

The new antibiotics of the present invention—Rufomycin A and Rufomycin B—are, by vitrue of the hereinbefore disclosed properties and activities, useful in vitro against bacteria belonging to the genus Mycobacterium, especially against *Mycobacterium tuberculosis* var. *hominis*. For disinfectant purposes, they are preferably used in a soluble form thereof, i.e. in aqueous solution. It is one of the most remarkable characteristics of the antibiotics that they are quite effective against streptomycin resistant and neomycin resistant strains, and thus they are favorably usable in combating these resistant strains to which Streptomycin and/or Neomycin are inactive.

Rufomycin is insoluble in water as mentioned above, which may make it inconvenient for Rufomycin per se to be used. However, Rufomycin can form a variety of esters with acid. Rufomycin esters with polybasic acids such as phosphoric acid, sulfuric acid, succinic acid, glutaric acid, etc. are per se generally not so readily soluble in water, but they can easily dissolve in water, when neutralized with aqueous alkali such as sodium hydroxide, potassium hydroxide, etc. and have the same pharmacological activity as Rufomycin per se. Rufomycin is preferably used in a form of its polybasic acid ester as an aqueous solution the Rufomycin esters with polybasic acids are the invention of the inventors Hayao Nawa, Koiti Nakazawa, Akira Miyake and Takaaki Kamiya and are disclosed and claimed in U.S. patent application Ser. No. 173,855, filed Jan. 29, 1962, now U.S. Patent No. 3,330,725. Alternatively, Rufomycin is homogeneously dispersible in water by utilizing conventional so-called non-ionic surface-active agents such as polyoxyethylene-ether of castor oil, etc. Hence, Rufomycin per se can also be utilized as an aqueous colloid solution or an aqueous suspension for its intended purposes.

The invention will now be described in further particularity by means of the following example. It will be understood, of course, that the invention is not limited to the particular details of this example since other microorganisms of culture conditions within the skill of the art may be employed to produce Rufomycin. All percentages are on a weight basis, unless otherwise noted. Temperatures are all uncorrected, and abbreviations "kg.," "g.," "mg.," "mcg.," "l.," "ml.," and "cm.," mean kilogram, gram, milligram, microgram, liter, milliliter, and centimeter, respectively.

EXAMPLE

Into each of four 2 l.-flasks was poured 500 ml. of a culture medium consisting of 2.0% of glucose, 0.6% of meat extract, 0.6% of sodium chloride, 0.6% of calcium carbonate and water. The medium was inoculated with *Streptomyces atratus* (IFO—3897; ATC–14046) and incubated at 28° C. for two days under shaking on a reciprocal shaker to prepare a preincubation broth. In an 1000 l.-tank, 500 l. of an aqueous culture medium consisting of 2.0% of glucose, 0.6% of meat extract, 0.5% of sodium chloride, 0.5% of peptone, 0.3% of rice bran, 0.3% of calcium carbonate and water and being adjusted to pH 7.0 was inoculated with the resulting pre-incubation broth in the four flasks, and the inoculated medium was incubated at 28° C. under agitation and aeration of 50 l. per minute. Before the incubation, 50 g. of an anti-foaming oil was added to the culture medium and additional 170 g. of the same anti-foaming oil was added at a proper time during the incubation. The total weight, i.e. 220 g., of the anti-foaming oil corresponds to about 0.22% relative to the whole medium. Progress of the incubation during 89 hours is as shown in the following table. Antibiotic potency was measured by the agar-dilution method using *Mycobacterium avium*, Streptomycin resistant strain, as a test microorganism and shown as Waksman's dilution units (U) per milliliter of the broth.

| Incubation period from the start (hours) | pH of the broth | Antimicrobial potency of the broth (U/ml.) |
| --- | --- | --- |
| 0 | 7.05 | <10 |
| 17 | 7.08 | <10 |
| 30 | 8.21 | <10 |
| 41 | 7.98 | <10 |
| 54 | 7.98 | 20 |
| 65 | 7.89 | 50 |
| 78 | 7.80 | 100 |
| 89 | 7.30 | 100 |

The resultant incubation broth, after addition of a filter aid, was filtered to give 450 liters of filtrate and 29 kg. of mycelium. The filtrate was adjusted to pH 2 and extracted twice with one-third the quantity of ethyl acetate. The ethyl acetate layers were combined, and the combined solution was washed with a small quantity of water and then condensed under reduced pressure to about 1 liter.

On the other hand, the mycelium was suspended in three times the quantity of methanol and the suspension was agitated at a room temperature to extract the antibiotics. Then the suspension was filtered and the filtrate was condensed under reduced pressure to about 10 liters. To the condensate was added 2 l. of water, the aqueous mixture was adjusted to pH 2 and extracted twice with one fourth the quantity of ethyl acetate. The ethyl acetate extracts were combined and the combined solution was concentrated under reduced pressure to about 1 l.

Each of these concentrated ethyl acetate solutions, obtained from the filtrate and the mycelium, was respectively submitted to the following treatments.

To the ethyl acetate solution was added about one-fifth the quantity of water, and the mixture was shaken while adjusting the pH of the water layer to 9. This treatment was repeated once more, whereupon the ethyl acetate layer was fairly decolorized. The solvent was evaporated under reduced pressure to leave above 30 to 35 g. of a residue, which was dissolved in 300 ml. of ethanol. The solution was allowed to flow through a tower packed with 1 kg. of alumina, and developed with ethanol, and finally eluted with 80% aqueous ethanol to divide the components into three bands, that is yellow, purple and orange yellow bands. The orange yellow band corresponds to the objective antibiotics, Rufomycin.

The effluent corresponding to the last band was collected and concentrated under reduced pressure to about 100 ml. The concentrated solution was allowed to stand overnight to separate out about 4 g. of Rufomycin B as crystals. The mother liquor was condensed to dryness under reduced pressure to leave about 15 g. of Rufomycin A, which may be further purified by repeating adsorption chromatography on alumina column as aforementioned.

Having thus disclosed the invention, what is claimed is:

1. Rufomycin A, which is characterized by the following properties:
  (a) a physiologically neutral substance obtained usually as yellow powder;
  (b) insoluble in water and not easily soluble in ethyl ether, petrol ether, benzene, and carbon tetrachloride, but easily soluble in methanol, ethanol, propanol, ethyl acetate, chloroform, pyridine, dioxane, glacial acetic acid, acetone, dimethylformamide, and 2-methoxyethanol;
  (c) negative to ninhydrin, Molish's, Fehling's, Sakaguchi's, ferric chloride, maltol, and sodium nitroprusside reactions, but positive to diazo reaction;
  (d) infrared absorption bands at the wave lengths in microns of 3.0, 3.27, 3.4, 6.04, 6.1, 6.53, 6.64, 6.90, 7.1, 7.32, 7.55, 8.02, 8.54, 8.85, 9.37, 9.80, 10.05, 10.37, 10.96, 11.43, 12.20, 13.15, and 13.55;
  (e) ultraviolet absorption:

$\lambda_{max.}$ 222 m$\mu$ ($E^{1\%}_{1cm.}=450$)

282 m$\mu$ ($E^{1\%}_{1cm.}=100$), and 355 m$\mu$ ($E^{1\%}_{1cm.}=27$)

(f) specific rotation: $[\alpha]_D^{24}=-64°$ (c.=1%, in ethanol); and
  (g) elementary analytical value (average) of 62.325% of carbon, 7.51% of hydrogen and 10.985% of nitrogen.

2. Rufomycin B, which is characterized by the following properties:
  (a) a physiologically neutral substance obtained usually yellow crystals melting at 165–168° C. with decomposition;
  (b) insoluble in water, hardly soluble in ethyl ether, petrol ether, benzene, and carbon tetrachloride, and slightly soluble in ethanol, and butanol, but easily soluble in methanol, ethyl acetate, chloroform, pyridine, dioxane, and glacial acetic acid;
  (c) negative to ninhydrin, Molish's, Fehling's Sakaguchi's, ferric chloride, maltol, and sodium nitroprusside reactions, but, positive to diazo reaction;
  (d) infrared absorption bands at the wave lengths in microns of 3.04, 3.26, 3.38, 5.94, 6.05, 6.10, 6.53, 6.6, 6.9, 7.1, 7.25, 7.34, 7.62, 7.85, 8.05, 8.32, 8.50, 8.85, 9.26, 10.35, 10.90, 11.45, 12.15, 13.10, and 13.55, in potassium bromide disk;
  (e) ultraviolet absorption:

$\lambda_{max.}$ 222 m$\mu$ ($E^{1\%}_{1cm.}=524$)

282 m$\mu$ ($E^{1\%}_{1cm.}=113$), and 355 m$\mu$ ($E^{1\%}_{1cm.}=28$)

in ethanol;
  (f) specific rotation: $[\alpha]_D^{20}=-120°$ (c.=0.5%, in methanol);
  (g) pKa′ 8.4 in aqueous ethanol; and
  (h) elementary analytical value (average) of 62.283% of carbon, 7.827% of hydrogen and 11.753% of nitrogen.

3. A process for preparing a member selected from the group consisting of Rufomycin A as defined in claim 1, Rufomycin B as defined in claim 2 and a mixture thereof, which comprises the steps of inoculating an aqueous nitrient medium containing an assimilable carbon source, a digestible nitrogen source and minerals with *Streptomyces atratus* nov. sp. IFO–3897, ATCC–14046, and incubating the inoculated medium at a temperature of about 20° to 35° C.

4. A process for preparing a member selected from the group consisting of Rufomycin A as defined in claim 1, Rufomycin B as defined in claim 2, and a mixture thereof, which comprises the steps of inoculating an aqueous nutrient medium containing an assimilable carbon source, a digestible nitrogen source and minerals with *Streptomyces atratus* nov. sp. IFO–3897, ATCC–14046, incubating the inoculated medium at a temperature of about 20° to 35° C., and recovering the antibiotic from the incubation broth.

5. A process for preparing a member selected from the group consisting of Rufomycin A as claimed in claim 1 and Rufomycin B as claimed in claim 2, which comprises the steps of inoculating an aqueous nutrient medium containing an assimilable carbon source, a digestible nitrogen source and minerals with *Streptomyces atratus* nov. sp. IFO–3897; ATCC–14046, incubating the inoculated medium at a temperature of about 20° to 35° C., recovering a mixture of Rufomycin A and Rufomycin B, and separating one from the other.

6. The process as claimed in claim 5, wherein the separation is effected by dissolving the mixture of Rufomycin A and Rufomycin B in a solvent selected from the group consisting of ethanol, propanol, butanol and an aqueous lower aliphatic alcohol, and separating out Rufomycin B as crystals to leave in the mother liquor Rufomycin A which is then recovered as powder by removing the solvent.

7. A method for disinfecting bacteria of the genus Mycobacterium by application of a disinfecting agent, wherein the disinfecting agent comprises, as active disinfectant, a member selected from the group consisting of Rufomycin A, Rufomycin B and the mixture thereof.

8. A method for in vitro disinfection against bacteria of the genus Mycobacterium, which comprises applying to an in vitro locus infected with said bacteria a disinfecting agent in the form of an aqueous solution of a member selected from the group consisting of Rufomycin A, Rufomycin B and the mixture thereof.

References Cited
UNITED STATES PATENTS 2,886,595   5/1959   Heinemann et al. _____ 167—65

SAM ROSEN, Primary Examiner

U.S. Cl. X.R.

424—121